Jan. 4, 1949.  E. N. ANGUS  2,458,045
BLOWER UNIT AND ASSEMBLY
Filed Jan. 23, 1945  3 Sheets-Sheet 1

Inventor
Everett N. Angus,
By J. Stuart Freeman,
Attorney

Inventor
Everett N. Angus,

Jan. 4, 1949. E. N. ANGUS 2,458,045
BLOWER UNIT AND ASSEMBLY
Filed Jan. 23, 1945 3 Sheets-Sheet 3

Inventor
Everett N Angus,
By J. Stuart Freeman.
Attorney

Patented Jan. 4, 1949

2,458,045

UNITED STATES PATENT OFFICE 2,458,045

BLOWER UNIT AND ASSEMBLY

Everett N. Angus, Oaklyn, N. J.

Application January 23, 1945, Serial No. 574,133

3 Claims. (Cl. 34—222)

The object of the invention is to provide improvements in fan and blower constructions, and in their combination with processing machines, the term blower being hereinafter employed to denote any type of blower or fan structure to which the invention can be applied.

In various commercial operations, blowers are used either singly or in multiple to circulate or impel various gases, and especially air, that more often than not is laden with particles of dust, hair, lint, fibers of all sorts and other undesirable matter, and with varying degrees of dryness or moisture content at temperatures ranging from far above to far below that of the surrounding atmosphere. Under such conditions, a blower that is designed for practically universal use, and with its rotary and stationary parts so close-fitting as to make possible pressures or vacuums equivalent to several inches of water column, it is only natural that the passageways become clogged frequently and to such an extent as to rapidly decrease the blower's operating efficiency, unless periodically cleaned at frequent intervals.

A more specific object, therefore, is to provide blower constructions in which the fan or rotary element is readily movable into and out of operative relation with respect to the stationary element, comprising the casing and attached members, or in which the casing is movable away from the fan, either in a rectilinear or axial direction, or oscillatable upon a hinged mounting.

Thus, the invention contemplates either or both cleaning the interior of the blower casing from the outside of the machine to which it may be attached, or from the interior of such machine. A class of machines that has heretofore given no end of trouble, and to which the improved blower construction is particularly adapted comprises those used for drying, carbonizing and otherwise conditioning textile fibers, and in which there accumulates considerable waste, that heretofore has required much time and resulting loss in cleaning, either at the end of a regular run or even during a run, when the efficiency of the machine becomes lowered to a prohibitive degree.

Figure 1:
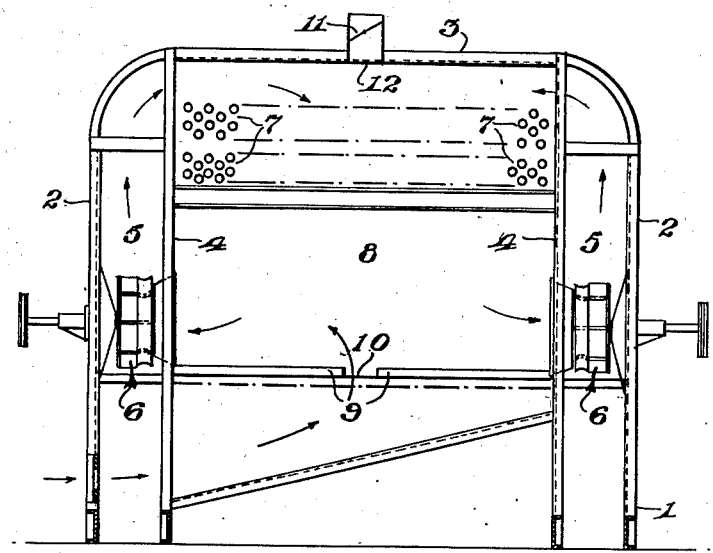
Figure 2:
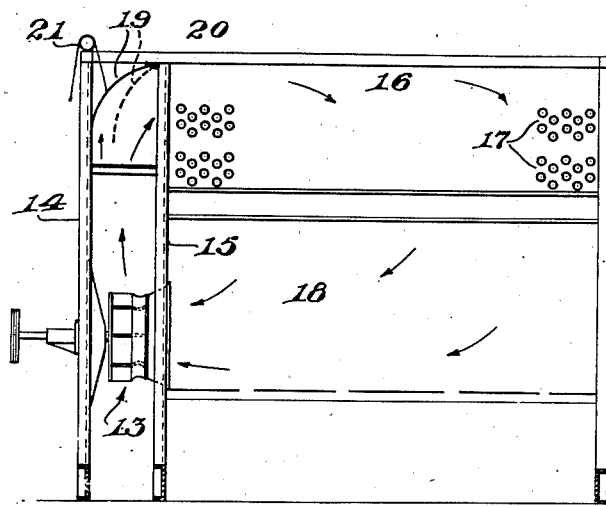
Figure 3:
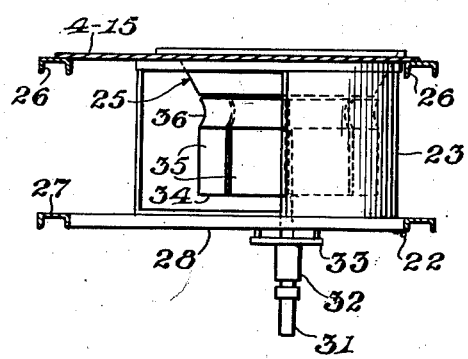
Figure 4:
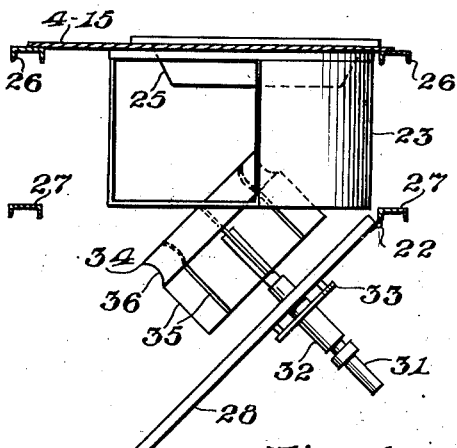
Figure 5:
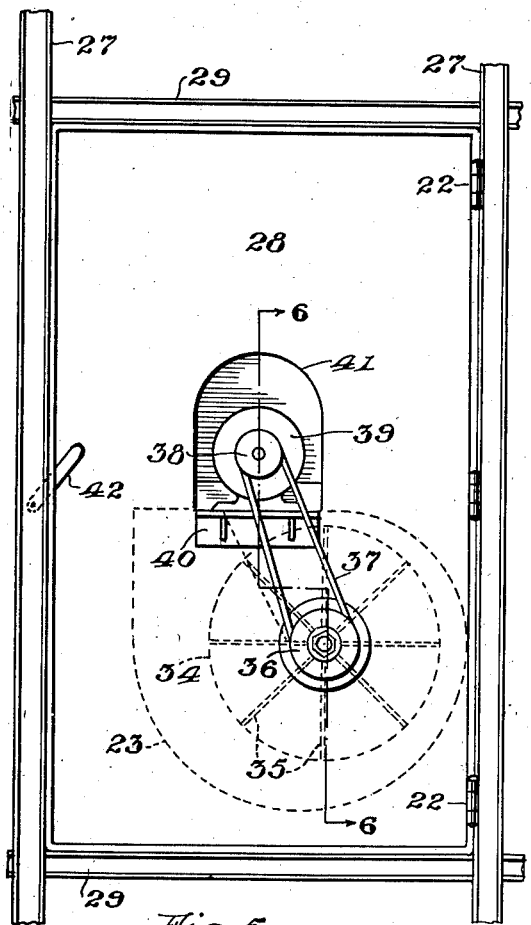
Figure 6:
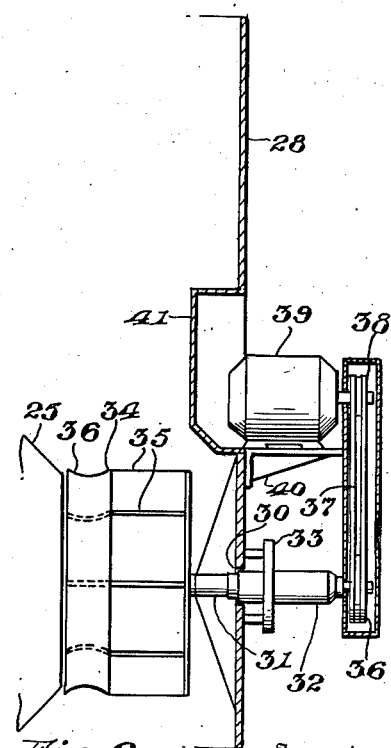
Figure 7:
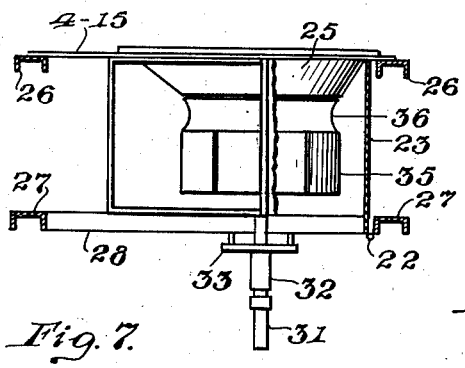
Figure 8:
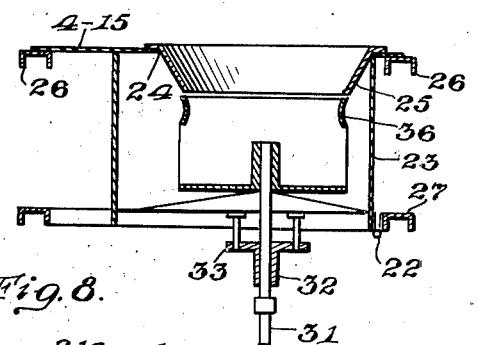

With the objects thus briefly and broadly stated, the invention comprises further details of construction and operation, which are hereinafter fully brought out in the following description, when read in conjunction with the accompanying drawings, in which Fig. 1 is a vertical transverse section through a representative type of processing machine comprising one or more blowers upon each of its opposite sides; Fig. 2 is a similar section through a machine in which one or more blowers are located upon only one side; Fig. 3 is an enlarged plan view of a blower comprising one embodiment of the invention with its associated mounting or supporting frame work; Fig. 4 is a similar view but with the rotor element and its support swung open for cleaning the interior of the stationary element and casing; Fig. 5 is a front elevational view of the improved blower in closed or operative position; Fig. 6 is a fragmentary sectional view on the line 6—6 of Fig. 5; Fig. 7 is a view similar to Fig. 3, but showing the interior of the casing; Fig. 8 is a horizontal section of the blower when closed, taken on a plane through its axis of rotational and Fig. 9 is a fragmentary perspective view of a portion of a processing machine, showing the exteriors of three blowers operatively mounted.

Referring to the drawings, there is shown in Fig. 1 a portion of a machine employed in the processing of wool and other textile fibers. It primarily consists in an external casing 1 having laterally opposite side walls 2 that merge into a top wall 3. Spaced within said side walls are longitudinally extending partitions 4, providing ducts 5 that lead from similar blowers 6 upwardly and thence inwardly beneath the top wall 3, whence the air currents pass downwardly between heater units or coils 7, heated by steam or otherwise. The warm air thence proceeds downwardly over and through the mass of loose fiber or other material in the chamber 8 and resting upon the partition 9, through which opens an air intake 10, the amount of fresh air being governed by an adjustable damper 11, controlling the effective opening of an outlet 12 in the top 3. Adjustment of said damper or other form of control thereby regulates the ratio of fresh air to the moisture-carrying air circulating in the processing, drying or treating machine, or in a given section of the same, and is governed by the external humidity and temperature, and upon the material, its moisture content and heat available upon the interior.

Referring to Fig. 2, the section of machine here represented shows a blower 13 in a vertical duct, between an outer casing wall 14 and a partition 15 spaced therefrom. This duct leads into an upper chamber 16 containing suitable heater elements 17, whence warm air impelled by said blower passes through material in a chamber 18. In this form of machine, a preferably curved deflector 19, pivotally supported at 20, is regulated by suitable means 21 to variably release a given amount of moisture laden air, while the remainder of such air is recirculated, the escaping air being replaced by fresh air admitted through an inlet positioned at any desired point in the path of air circulation.

Figure 9:
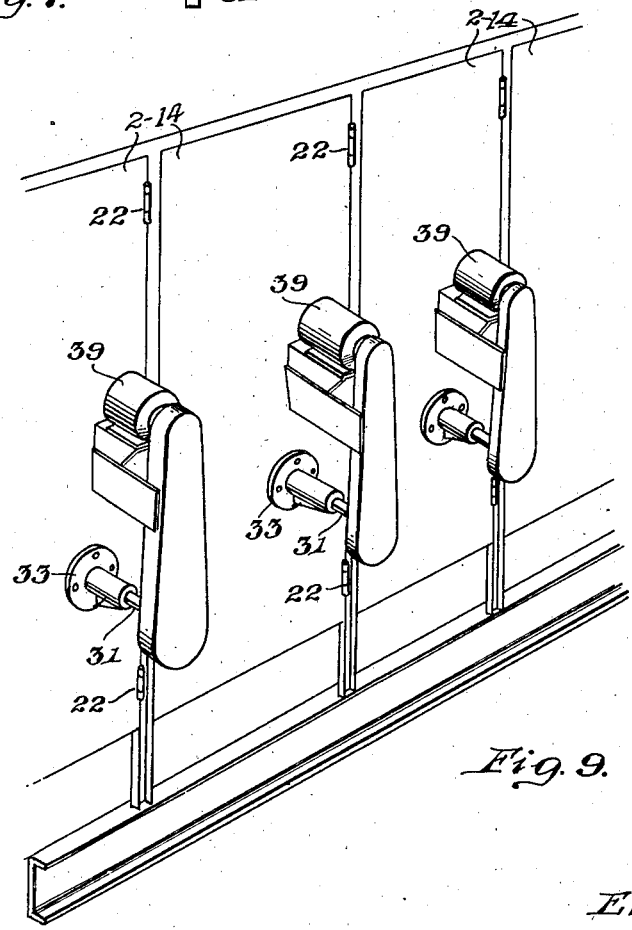

Referring to Figs. 3-9, a blower comprising one embodiment of the invention is shown in operative position between the walls 2 and 4 of the machine shown in Fig. 1 and the walls 14 and 15 of the machine shown in Fig. 2, the walls 14 and 15 also forming the fixed or stationary inner walls of their respective blowers, while the walls 2 and 4 are hingedly mounted at 22 to form independent panels, as shown in Fig. 9. For the sake of brevity only the walls 2 and 4 will be referred to as representative of the two machines. Each blower also comprises an involute housing 23 having its inner edge portions secured to and closed by the wall 4, except for an inlet aperture 24 in which is secured an annular inwardly taping inlet cone 25, preferably in the form of the frustrum of a cone. Upon the opposite sides of the aperture 24 the inner wall 4 is reinforced in any suitable manner as by channels 26, while the outer wall 2 is defined by vertical channels 27, between which extends, and upon one of which in each instance is pivotally mounted a closure panel 28, the upper and lower edges of which closely cooperate with horizontally extending channels 29, which are secured to and directly connect said first-mentioned channels.

Each of the said panels is provided with an aperture 30, through which extends a smaller shaft 31 supported by a bearing 32, which is in turn secured to said panel-closure by means of a plate 33, spaced by bolts from said panel so as to permit a relatively small quantity of air to pass inwardly between the edges of the aperture 30 and the adjacent surface of said bearing 32. Upon the inner end of said shaft is carried the rotor element 34 of the blower, principally comprising radial vanes 35 of any desired shape and construction, and surrounded radially by the casing 23. The innermost portions of the radially outer free edges of said vanes are connected by an oppositely flared ring 36, which revolves in very close proximity to and, comprises in effect a continuation of the stationary inlet cone 25. Thus, when the blower is in closed or operative position, its elements are related as shown in Figs. 3, 5, 6, 7, 8 and 9, while Fig. 4 shows it in open, inoperative position, in which condition its entire interior is readily accessible for cleaning, repair or renewal of parts, incident to the operation of a blower of this type.

For driving the rotor of the blower, a pulley 36 is mounted upon the outer end of the shaft 31, and connected by a belt 37 to a pulley 38, carried by the shaft of a motor 39, mounted upon the closure-panel 28 by means of a bracket 40 and for the sake of compactness, if desired, extending into a recess 41 in said panel (Figs. 5 and 6). The panel may be secured in closed position by a suitable latch 42. The blower may be driven by direct connected motor with blower rotor mounted directly on extended motor shaft.

Enclosed machines of the class herein referred to comprise dryers, carbonizers, conditioners, etc., and usually process loose materials, such as wool, cotton, rayon, and the like, as well as other materials in the form of flakes, crystals, sheets and powders, and a portion of each such material is invariably carried with the circulating air through the blowers, where a portion is deposited and in time builds up or accumulates until it seriously interferes with the flow of air, and proportionately lowers the operating efficiency of the blower directly and indirectly the machine as well. The power of the blower required for certain work of this nature is represented by a pressure or vacuum up to four inches of water, which is beyond the reasonable limit of the propeller type of fan, and to maintain such high pressures a constantly clean condition must be maintained, and with the present improvement in blowers, which are generally used in multiple, the machine as a whole does not have to be shut down while a given blower is being cleaned. Repeated and thorough cleaning from each fan of all deposits likewise greatly minimizes the fire hazard that would otherwise develop.

Having thus described my invention, what I claim and desire to protect by Letters Patent of the United States is:

1. A processing machine, comprising a housing having an inner wall having an air inlet aperture, an outer wall panel spaced from said inner wall and oscillatably mounted, an intake cone surrounding said aperture, a centrifugal fan comprising radial blades carried by said panel and provided with a substantially symmetrical, reversely curved band forming a continuation of said cone when in operative position and through which said blades extend, a compartment for material being treated upon the opposite side of said inner wall, an air conditioning compartment connected with said first compartment, and both of said compartments and the space between said walls being connected in a closed recirculation circuit.

2. A processing machine, comprising a housing having an inner wall having an air inlet aperture, an outer wall panel spaced from said inner wall and oscillatably mounted, an intake cone surrounding said aperture, a centrifugal fan comprising radial blades carried by said panel and provided with a substantially symmetrical, reversely curved band forming a continuation of said cone when in operative position and through which said blades extend, a compartment for material being treated upon the opposite side of said inner wall, an air conditioning compartment connected with said first compartment, both of said compartments and the space between said walls being connected in a closed recirculation circuit, and adjustable means to permit a predetermined amount of fresh air to enter said circuit and replace a corresponding amount of exhaust air released therefrom.

3. A processing machine, comprising a housing having a compartment for material being treated, a second compartment for conditioning air or gas, one of said compartments having a wall provided with a plurality of apertures, and an outer wall spaced from said apertured wall and provided with a hingedly mounted panel opposite each of said apertures, in combination with a centrifugal fan comprising radial blades carried by each of said panels and independently movable into and out of cooperative relation with the respective apertures, an intake cone surrounding each of said apertures, a substantially symmetrical, reversely curved band connecting the free edge portions of the blades of said fan and normally forming a continuation of said cone, and a motor also carried by each panel to drive the fan carried thereby.

EVERETT N. ANGUS.

REFERENCES CITED

The following references are of record in the file of this patent:

UNITED STATES PATENTS

| Number | Name | Date |
|---|---|---|
| 694,648 | Jordan et al. | Mar. 4, 1902 |
| 1,076,142 | Mellin | Oct. 21, 1913 |
| 1,404,614 | Howson | Jan. 24, 1922 |
| 1,471,559 | Knauf | Oct. 23, 1923 |
| 1,513,639 | Schwartz | Oct. 28, 1924 |
| 1,578,027 | Hassch | Mar. 23, 1926 |
| 1,768,486 | Ogden | June 24, 1930 |
| 1,995,675 | Furbush | Mar. 26, 1935 |
| 2,047,156 | Reumann | July 7, 1936 |
| 2,117,416 | Hagan | May 17, 1938 |
| 2,280,704 | Hurxthal | Apr. 21, 1942 |

FOREIGN PATENTS

| Number | Country | Date |
|---|---|---|
| 386,432 | Great Britain | Jan. 19, 1933 |